though the tongue from the towing vehicle.

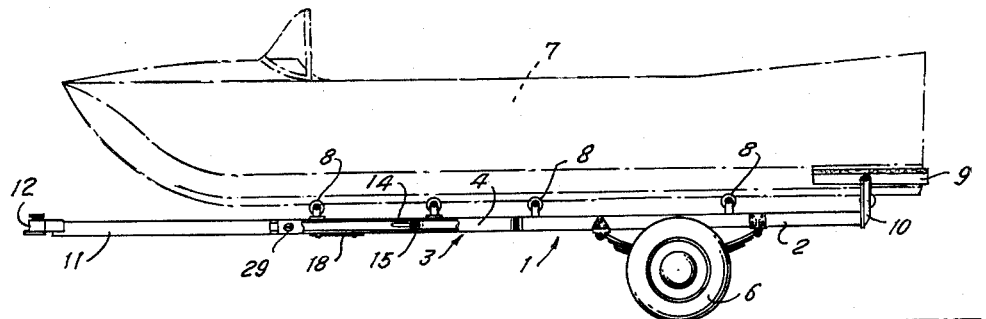
Fig. I
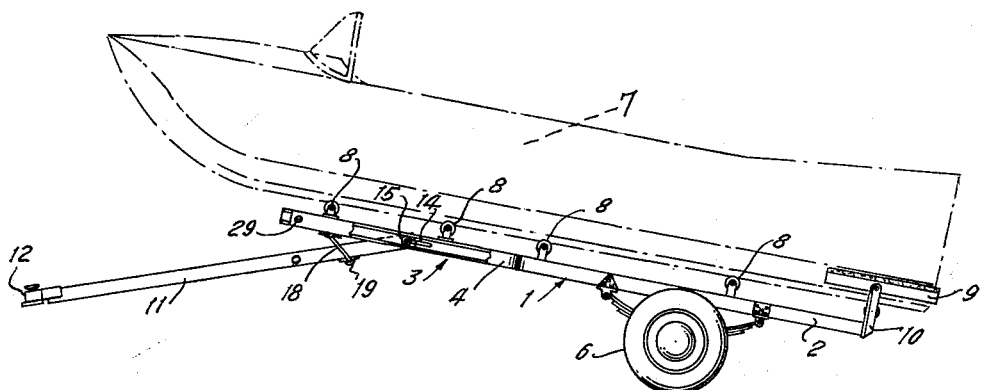
Fig. II
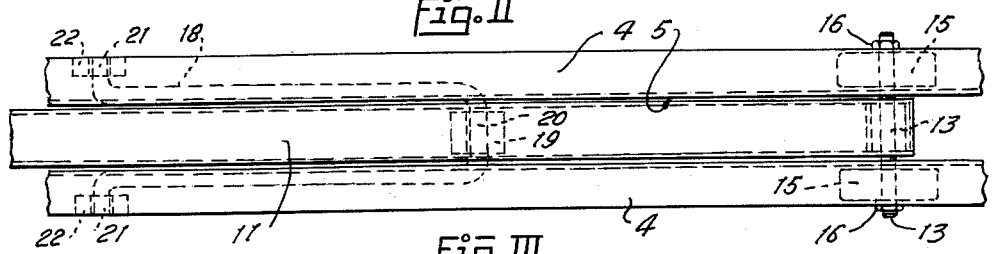
Fig. III
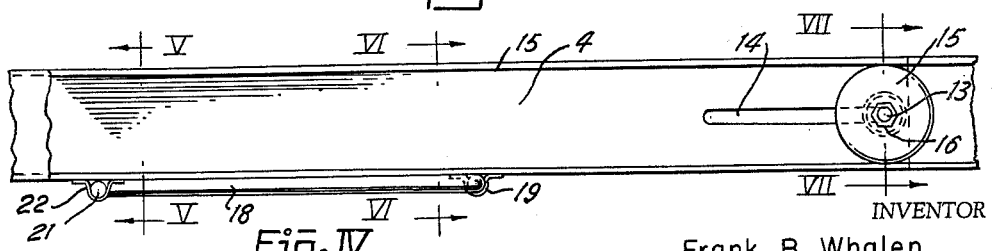
Fig. IV
INVENTOR
Frank B. Whalen
BY Howard E. Moore
ATTORNEY

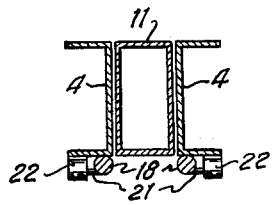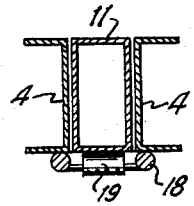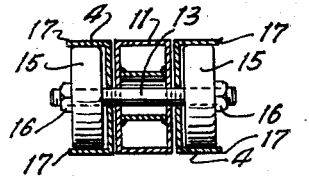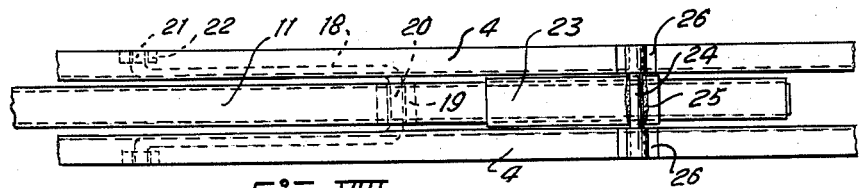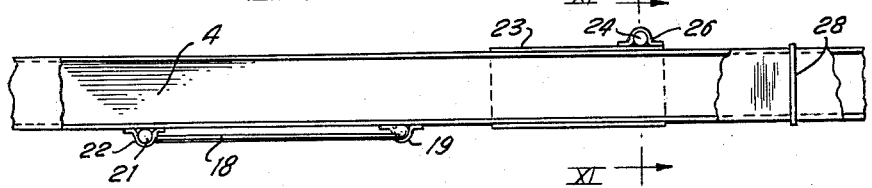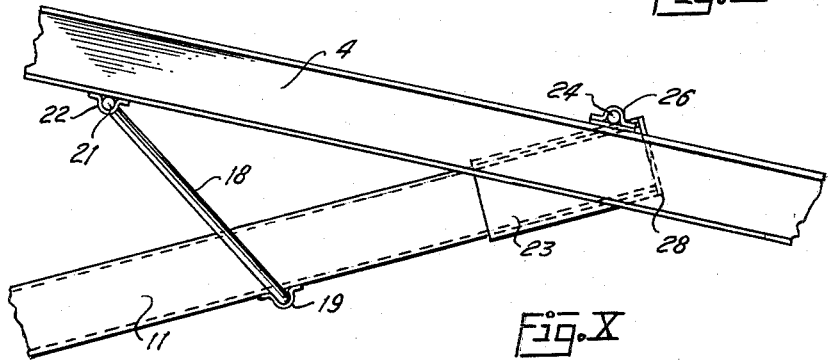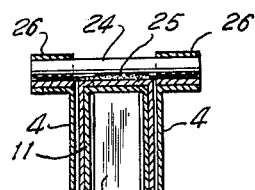

United States Patent Office
3,102,649
Patented Sept. 3, 1963

3,102,649
TRAILER TILTING APPARATUS
Frank B. Whalen, Plano, Tex., assignor to Lone Star Boat Company, Plano, Tex., a corporation of Texas
Filed Jan. 23, 1961, Ser. No. 84,352
4 Claims. (Cl. 214—505)

This invention is concerned with improvements in a trailer for carrying a boat or other equipment, and is particularly concerned with a trailer wheren the frame is arranged to pivot and tilt with relation to the tongue, and more particularly is concerned with such a tilting trailer wherein the pivot connection between the trailer and the tongue is arranged to allow relative longitudinal movement between the frame and the tongue as the trailer is tilted overcoming the necessity for the wheels of the trailer and the tongue to move toward each other.

Boat trailers are customarily constructed to that the frame of the trailer and the tongue are pivotally connected whereby the frame may be tilted rearwardly to facilitate the unloading and loading of the boat on the frame.

A disengageable latch is usually provided between the tongue and frame to maintain them in aligned position while the boat is being transported, but which can be unlatched to permit the frame to be tilted with relation to the tongue.

Also, various types of power actuation for tilting the frame with relation to the tongue have been provided, such as hydraulic cable, winch means, and gear arrangements.

The particular means for latching and unlatching the frame with relation to the tongue, and the power tilting arrangement, are not a part of this invention. For purpose of this invention, it may be assumed that the trailer may be tilted manually with relation to the tongue.

It is customary practice to back the boat trailer up to the edge of the water, disconnect the frame from the tongue, and tilt the frame rearwardly to launch the boat into the water while the tongue is still attached to the towing vehicle. It is customary to set the brakes on the towing vehicle or throw it in gear while such operation is accomplished.

Since the pivot connection between the frame and the tongue is disposed in a fixed vertical plane, the distance from the point of connection of the tongue to the hitch ball on the trailer hitch and the axle of the wheels supporting the trailer frame must shorten as the trailer frame is tilted with relation to the tongue. It is obvious that either the wheels supporting the trailer frame must move toward the towing vehicle, or the tongue or towing vehicle must move toward the trailer wheels as the trailer is tilted. If the tongue is attached to the towing vehicle, which is in gear or whereon the brakes are set, the trailer wheels must move toward the towing vehicle; or if the brakes are not set on the towing vehicle, or it is not in gear, the towing vehicle would still be difficult to move either by reason of its weight or by reason of the wheels being in a hole or depression. In many instances it has been found that the wheels of the trailer are embedded in mud or in a hole or depression which prevents the wheels of the trailer from moving toward the towing vehicle. Thus, it is usually difficult, or impossible, to tilt the trailer, without disconnecting the tongue from the towing vehicle.

This invention is intended to overcome the above recited problems in that there is provided a pivotal connection between the frame and the tongue which permits the frame and the tongue to move longitudinally with respect to each other as the frame is tilted to thereby increase the arc distance through the pivot connection to prevent the trailer wheels and the hitch connection for the tongue from moving toward each other.

It is, therefore, a primary object of this invention to provide a pivotal connection between a tilting trailer frame and the tongue which eliminates the necessity of the trailer wheels and the attachment point between the tongue and the towing vehicle moving toward each other.

A further object of the invention is to provide a pivotal and longitudinally movable connection between a trailer frame and the tongue therefor which permits the frame to tilt with relation to the tongue, and the frame and tongue to move longitudinally with relation to each other as the frame is tilted without the necessity of the wheels on the trailer and the point of connection with the towing vehicle moving toward each other.

A still further object of the invention is to provide a pivotal connection between a trailer frame and the tongue therefor, which pivotal connection is movable longitudinally with relation to the frame.

Still another object of the invention is to provide a pivotal connection between a trailer frame and the tongue therefor, wherein the pivotal connection is arranged to move longitudinally with relation to the frame on rollers.

Another object of the invention is to provide a pivotal connection between a trailer frame and a tongue therefor which includes a sleeve pivotally attached to the frame through which the tongue may slide.

Other and further objects of the invention will become apparent upon reading the detailed specification hereinafter following, and by referring to the drawings annexed hereto.

Suitable embodiments of the invention are shown in the attached drawings wherein:

FIGURE I is a side elevational view of a trailer incorporating my improvement on which is mounted a boat shown in broken lines;

FIGURE II is a side elevational view of the trailer in tilted position;

FIGURE III is a fragmentary, top plan view of the spaced guide channels of the trailer frame, with a tongue pivotally and slidably disposed therebetween;

FIGURE IV is a fragmentary, side elevational view of one of the guide channels constituting a part of the frame of the trailer, showing the elongated slot therein in which the pivotal connection between the tongue and the frame may slide;

FIGURE V is a cross-sectional view taken on the line V—V of FIG. IV;

FIGURE VI is a cross-sectional view taken on the line VI—VI of FIG. IV;

FIGURE VII is a cross-sectional view taken on the line VII—VII of FIG. IV;

FIGURE VIII is a fragmentary, top plan view of the spaced guide channels constituting a part of the frame, wherein the tongue is slidably connected thereto by means of a modified type of pivotal and slidable connection, comprising a pivoted sleeve disposed between the guide channels through which the inner end of the tongue is slidably disposed;

FIGURE IX is a fragmentary, side elevational view of the modified form shown in FIG. VIII;

FIGURE X is a side elevational view of the modified form, showing the frame tilted with relation to the tongue; and FIGURE XI is a cross-sectional view taken on the line XI—XI of FIG. IX.

In the drawings, numeral references are employed to designate the various parts shown in the drawings, and like numerals indicate like parts thorughout the various figures of the drawings.

The numeral 1 indicates a trailer frame which includes spaced side members 2, only one of which is shown in the drawing.

A forwardly extending bifurcated portion 3 of the trailer frame includes spaced parallel guide channel members 4, having a space 5 therebetween arranged to receive the inner end of the tongue 11 in the manner hereinafter described.

A pair of spaced wheels 6 are mounted under the trailer frame 1, and there is shown in broken lines a boat 7, which may be transported on the trailer.

A plurality of keel rollers, which are spaced in pairs transversely and centrally of the trailer, are indicated by the numeral 8, said keel rollers being usually made of hard rubber to facilitate loading and unloading of the boat as the keel of the boat is rolled thereover.

A pair of padded bolsters 9 are usually provided on the rear of trailer frame 1, said bolsters being mounted and supported upon frame members 10. The boat 7 is disposed upon the padded bolsters 9 while it is being transported.

The tongue 11, as shown, is a hollow box member 11, and has a conventional fitting 12 thereon for attachment to the tow ball of a trailer hitch secured to the rear bumper of the towing vehicle.

The inner end of the tongue 11 is pivotally attached between the guide channels 4 of the frame 1 by means of a pin 13 caused to extend through suitable aligned holes in the side walls of the tongue 11, and through elongated aligned slots 14 in the vertical walls of the guide members 4. Rollers 15 are rotatably attached to the outer ends of the pin 13, and are held thereto by means of nuts 16. The rollers 15 are rotatably disposed between the flanges 17 on the channel members 4, which provide tracks for the rollers 15. The pin 13 is movable longitudinally in the aligned parallel slots 14 provided in the guide channels 4, and the end of the tongue 11 is pivotal about the pin 13.

A clevis 18 has a closed end 20 which is attached to the underside of the tongue 11 by means of a loop clamp 19, so that the closed end 20 of the clevis 18 is rotatable in the loop clamp 19.

The clevis 18 has outwardly turned offset ends 21, which are pivotally secured to the underside of the parallel frame members 14 by means of loop clamps 22. The clevis 18 provides a guide and stabilizer for guiding the tongue 11 between the parallel frame members 4.

It will be seen that when the trailer frame 1 is tilted with relation to the tongue 11, as shown in FIG. II, the pin 13 is caused to slide longitudinally in the slots 14 as the rollers roll between the flanges 17 of the channel members 4, thus allowing the pivot to move longitudinally as it moves vertically to thereby increase the arc distance through the pivot from the trailer wheels to the point of attachment of the tongue to the towing vehicle as the trailer is tilted with relation to the tongue. Therefore, it is not necessary for the wheels 6 and the point of connection between the tongue and the towing vehicle to move toward each other as the trailer is tilted.

As the trailer frame 1 is tilted with relation to the tongue 11, it will be seen that the clevis 18 swings downwardly, and as the trailer frame and tongue are brought back into alignment, the clevis 18 will guide the tongue 11 into the space 5 between the spaced side frame members 4.

A modified form of pivotal and slidable connections between the tongue and the frame is shown in FIGS. VIII–XI, which includes a sleeve 23 through which the inner end of the tongue 11 is slidably disposed. A pivot pin 24 is welded, as indicated at 25, to the upper side of the sleeve 23, and the ends of the pin 24 are rotatably disposed in loop clamps 26, secured to the upper surface of the side frame members 4.

A stop plate 28 is provided on the outer end of the tongue 11 to engage the sleeve 23 to limit the slidable outward movement of the tongue with relation to the sleeve 23.

It will be seen that in the modified form, as the trailer frame 1 is tilted with relation to the tongue 11, the tongue is permitted to slide outwardly through the sleeve 23 as the frame pivots about the pivot pin 24 thereby lengthening the arc distance through the pivot between the wheels 6 and the point of attachment of the tongue to the towing vehicle, thereby eliminating the necessity of the trailer wheels 6 moving toward the point of attachment between the tongue and the towing vehicle.

The trailer frame 1 and the tongue 11 are customarily detachably secured together while the trailer is in transporting position, as shown in FIG. I, which may be accomplished by means of a withdrawable pin 29 extending through the side frames 4 and the tongue 11. Other means of disengageably locking the trailer frame to the tongue could, of course, be employed. As hereinabove mentioned, the trailer may be tilted either by power or manually. As shown, it would be tilted manually.

It will be understood that other means for increasing the arc distance between coupling of tongue to the towing vehicle and the trailer wheels could be devised without departing from the spirit and scope of the appended claims.

I claim:

1. In a trailer, a frame, a forwardly extending portion of the frame including parallel spaced apart members; a tongue having its inner end pivotally and slidably attached between the parallel members; and a substantially U-shaped clevice member having the closed end thereof embracing the tongue and being pivotally attached to the tongue, and the said U-shaped clevice member having laterally turned free ends thereon which are pivotally attached to the undersides of the parallel spaced apart members forwardly of the pivotal and slidable connection between the tongue and the parallel spaced apart members.

2. The combination called for in claim 1 wherein the connection between the tongue and the parallel members includes opposed longitudinal slots in the parallel members and a pivot member slidable and rotatable in the slots and attached to the tongue.

3. The combination called for in claim 1 wherein the connection between the tongue and the parallel members includes a sleeve pivotally connected to the parallel members with the tongue slidably extending through the sleeve; and means to limit the slidable movement between the sleeve and the tongue.

4. The combination called for in claim 2 wherein the spaced apart parallel members are channel members with the flanges thereon disposed in an outward direction, and with the addition of rollers on the outer ends of the pivot member rollable in the channels on the outer sides of the parallel spaced apart members.

References Cited in the file of this patent
UNITED STATES PATENTS

| | | |
|---|---|---|
| 998,988 | Reynolds | July 25, 1911 |
| 2,027,098 | Helms | Jan. 7, 1936 |
| 2,307,472 | Shuey | Jan. 5, 1943 |
| 2,327,308 | Johnston | Aug. 17, 1943 |
| 2,635,919 | Watson | Apr. 21, 1953 |
| 2,679,433 | Wasinger | May 25, 1954 |
| 2,795,345 | Crandall | June 11, 1957 |
| 2,887,238 | Huber | May 19, 1959 |
| 2,932,418 | Ripley | Apr. 12, 1960 |
| 3,053,572 | Harper | Sept. 11, 1962 |

FOREIGN PATENTS

| | | |
|---|---|---|
| 179,981 | Germany | Oct. 25, 1954 |